United States Patent
Canade

(10) Patent No.: US 12,219,931 B1
(45) Date of Patent: Feb. 11, 2025

(54) LEASH CLIP DEVICE AND SYSTEM

(71) Applicant: FABLE PETS INC., New York, NY (US)

(72) Inventor: Jeremy Canade, New York, NY (US)

(73) Assignee: FABLE PETS INC., New York, NY (US)

( * ) Notice: Subject to any disclaimer, the term of this patent is extended or adjusted under 35 U.S.C. 154(b) by 0 days.

(21) Appl. No.: 17/727,308

(22) Filed: Apr. 22, 2022

Related U.S. Application Data

(60) Provisional application No. 63/178,466, filed on Apr. 22, 2021.

(51) Int. Cl.
*A01K 27/00* (2006.01)
*F16B 45/04* (2006.01)

(52) U.S. Cl.
CPC .......... *A01K 27/005* (2013.01); *F16B 45/049* (2021.05); *F16B 45/053* (2021.05)

(58) Field of Classification Search
CPC ..... A01K 27/005; F16B 45/04; F16B 45/049; F16B 45/053; Y10T 24/45398; Y10T 24/4544
See application file for complete search history.

(56) References Cited

U.S. PATENT DOCUMENTS

| | | | | |
|---|---|---|---|---|
| 553,137 A * | 1/1896 | Shaw | .................... | F16B 45/049 24/600.7 |
| 553,432 A * | 1/1896 | Shaw | .................... | F16B 45/002 24/600.7 |
| 559,233 A * | 4/1896 | Tucker | .................. | F16B 45/045 24/600.7 |
| 1,626,866 A * | 5/1927 | Neilson | .................. | E21B 19/04 24/599.7 |
| D350,628 S | 9/1994 | Williams | | |
| D407,866 S | 4/1999 | Perrulli | | |
| D454,992 S | 3/2002 | Yantz | | |
| 6,662,753 B1 | 12/2003 | Sporn | | |
| 7,954,211 B2 * | 6/2011 | De Bien | .............. | A01K 27/005 24/606 |
| D669,233 S | 10/2012 | Ranstead | | |
| D713,606 S | 9/2014 | Ranstead | | |
| D796,124 S | 8/2017 | Ying | | |
| D874,074 S | 1/2020 | Chirico | | |
| D882,883 S | 4/2020 | Moore | | |
| D998,254 S | 9/2023 | Fang | | |

(Continued)

FOREIGN PATENT DOCUMENTS

| CN | 306134572 | 10/2020 |
|---|---|---|
| CN | 306633461 | 6/2021 |

OTHER PUBLICATIONS

Fable Pets_ Meet the Magic Link, available in Milled.com, announced Apr. 9, 2020 [online], [site visited Apr. 3, 2024], Internet URL: https:// milled.com/fablepets.com/meet-the-magic-link-Xx6Nx2z_3TODjaeD, 2020, 3 pages.

(Continued)

*Primary Examiner* — Robert Sandy
(74) *Attorney, Agent, or Firm* — Cooley LLP

(57) ABSTRACT

Embodiments of the subject disclosure are directed to a pet leash clip for a pet leash system. In some embodiments, the device includes a shelf-structure within the body extending preventing inadvertent opening of the pet leash clip.

12 Claims, 4 Drawing Sheets

(56) References Cited

U.S. PATENT DOCUMENTS

2014/0331944 A1   11/2014   Chirico
2016/0338322 A1   11/2016   Letke
2021/0185985 A1    6/2021   Therrian

OTHER PUBLICATIONS

Non-Final Office Action for U.S. Appl. No. 29/780,166 dated May 8, 2024, 11 pages.
ZeeDog-The Hands-Free Leash, announced in YouTube on Mar. 20, 2021 [online], [site visited Mar. 26, 2024], Available from the internet URL: https://www.youtube.com/watch?v=SkCAFL1WyEo, 2021, 2 pages.

* cited by examiner

LEASH CLIP DEVICE AND SYSTEM

RELATED APPLICATIONS

This application claims priority to and benefit of U.S. Provisional Application No. 63/178,466, filed Apr. 22, 2022, entitled "Leash Clip Device and System" the entire disclose is herein incorporated by reference in its entirety.

FIELD OF INVENTION

The present invention generally relates to leash systems, apparatuses and devices for use in, for example, a pet leash system thereof, and particularly, but not only, to a pet leash clip device with a shelf-structure to prevent inadvertent opening of the pet leash clip.

SUMMARY OF SOME OF THE EMBODIMENTS

In some embodiments, a pet leash clip device is provided, which is to be attached to a pet leash, enabling a complete pet leash system. In some embodiments, the device includes a circular base component having a dome structure rotatably connected to the base and possessing the same diameter as the base. The device also includes a body embedded down the center of the dome and a top of the base with a biasing element arranged within the recess. In some embodiments the device also includes a prong including a first portion received within the recess and a distal end, and a tab including a slot-engaging structure configured to ride within the slot.

Such embodiments may include one and or another of (and in some embodiments, a plurality of, and in still other embodiments, include a majority of, and in still further embodiments, include substantial all of or all of) the following advantages, objects, features, structure, functionality, steps, and/or clarifications, yielding yet further embodiments of the present disclosure:
  the body has a hook portion including a neck and a
    U-shaped upper portion forming a roof of a cavity of
    the clip, the U-shaped upper portion including a first
    side with a distal end having a surface;
  a/the body has a U-shaped lower portion forming a floor
    of the cavity of the clip;
  the body includes a first side with a distal end having a
    surface and a recess within the distal end;
  the body includes a slot within the first side;
  the body includes a shelf-structure extending beyond the
    first side at the distal end so;
  the first side is arranged to align with the first side of the
    U-shaped upper portion;
  the body has an opening established arranged between the
    surfaces of the distal ends of each of the first sides of
    the U-shaped upper portion and U-shaped lower portion;
  the prong is configured to slide within the recess;
  the biasing element is configured to bias the distal end of
    the prong such that it is at least immediately adjacent
    the distal end of the upper U-shaped portion so as to
    either close or substantially close the opening;
  the tab is configured to allow a user to move the prong to
    clear the opening to allow receiving of a pet collar.

It should be appreciated that all combinations of the foregoing concepts (or anywhere in this disclosure) and additional concepts discussed in additional detail below (provided such concepts are not mutually inconsistent) are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Accordingly, these and other features, objects, and advantages of embodiments of the disclosure will become even more evident by the following detailed description (of some of the embodiments), and corresponding figures associated therewith, a brief description of which is provided below.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION OF SOME OF THE EMBODIMENTS

Figure 1:
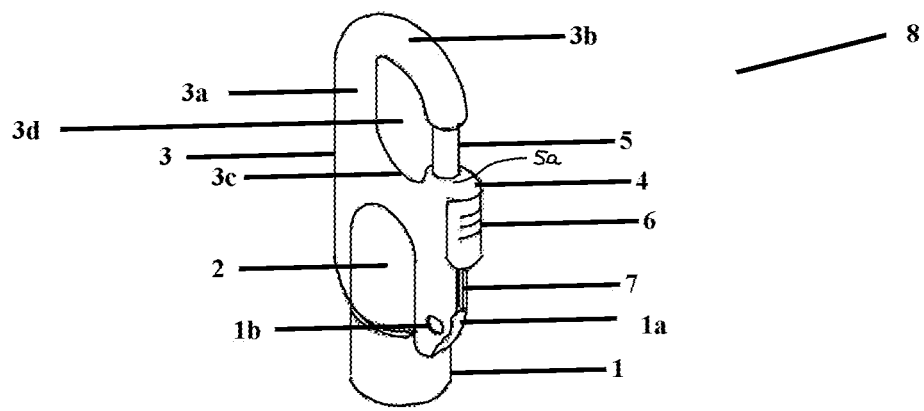
FIG. 1 is a perspective view of a pet leash clip device for a pet leash system, according to some embodiments.

FIG. 1 is a perspective view of a pet leash clip device 8 for a pet leash system, displaying a base component 1 (which may be circular) and a dome structure 2 connected to the base 1; a body 3, can also be provided, which is embedded down the center of dome 2 and a top of base 1. The dome structure 2 can be configured so as to ride and/or rotate/swivel relative to the base component 1. Also displayed is a hook portion 3a/3b of the body 3 including a neck 3a and U-shaped upper portion 3b forming a roof of the cavity 3d of the clip, a U-shaped lower portion 3c of the body, forming a floor of the cavity 3d of the clip, and a shelf-structure 4 (which may also be referred to as "shelf") extending beyond the first side at the distal end. Also displayed is a prong 5 oriented within a recess 5b and the distal end, and a tab 6 arranged so as to ride within a slot 7. An access cover 1a may be included which can configured to cover a lower portion of the recess 5b. The cover 1a may also be configured to pivot on pivot axis 1b. The pivot axis element can be configured to retain a bottom portion of a biasing element 5c within the recess 5b.

The shelf-structure 4 operates so as to block interaction with the tab 6, emanating from a direction above (e.g., the direction to which prong 5 is arranged relative to the shelf 4), for example, a loop of a pet collar. This functionality aids in keeping the loop from a pet collar (for example), from moving prong 5; that is, the loop of the pet collar, if the shelf 4 was not present, could interact with tab 6 so as to move prong 5 and open the clip—and the loop of the pet collar could be released. The configuration of the clip, especially the shelf structure 4 as it relates to tab 6, can alleviate this issue.

The tab 6 and prong 5 can be a single, integral component, which is received in the opening 5a, which is in the body 3; the opening 5a comprising the recess 5b which corresponds to the slot 7. The recess includes the biasing element 5c which can be a spring (e.g., coil spring) that applies a force against the integral component of the tab/prong such that the prong 5, in a rest position, closes the cavity 3d of the clip. A user must move the prong 5 downward (i.e., toward the base component) to allow an external element/loop to be received in the cavity 3d so that it rides along the hook portion (e.g., a metal/plastic loop of a pet collar). Once the loop is over the hook portion 3a/3b, the user can then release the tab 6, and the biasing element/spring forces the prong 5 toward the hook portion 3a/3b so as to close an opening to the cavity 3d.

Figure 2:
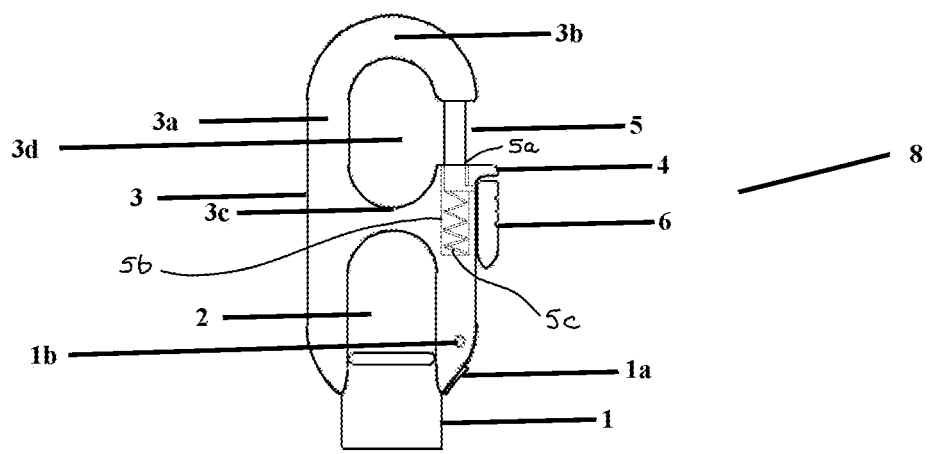
FIG. 2 is a side view of a pet leash clip device for a pet leash system, according to some embodiments.

FIG. 2 is a side view of a pet leash clip device 8 for a pet leash system, displaying the base component 1 and the dome structure 2 connected to the base 1; the body 3, which is embedded down the center of the dome 2 and the top of the base 1. Also displayed is a side view of the hook portion 3a/3b of the body 3 including the neck 3a and the U-shaped upper portion 3b forming a roof of the cavity 3d of the clip, the U-shaped lower portion 3c of the body 3 forming a floor of the cavity 3d of the clip, and the shelf-structure 4 extending beyond the first side at the distal end. Also displayed is the prong 5 oriented within the recess and the distal end; a side view of the tab 6; the access cover 1a; and the pivot axis 1b, according to some embodiments. FIG. 2 includes dashed/hidden lines to show the recess 5b associated with opening 5a and biasing element 5c.

Figure 3:
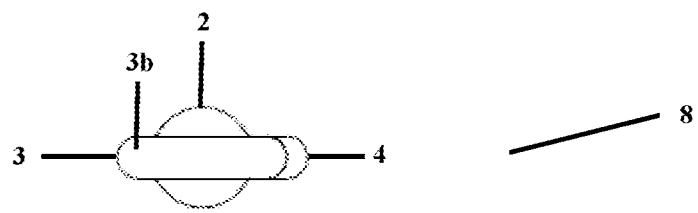
FIG. 3 is a top view of a pet leash clip device for the pet leash system, according to some embodiments.

FIG. 3 is a top view of a pet leash clip device 8 for the pet leash system, displaying the dome structure 2; the top of the body 3, specifically the U-shaped upper portion of the body 3b; and the extending shelf-structure 4, according to some embodiments.

Figure 4:
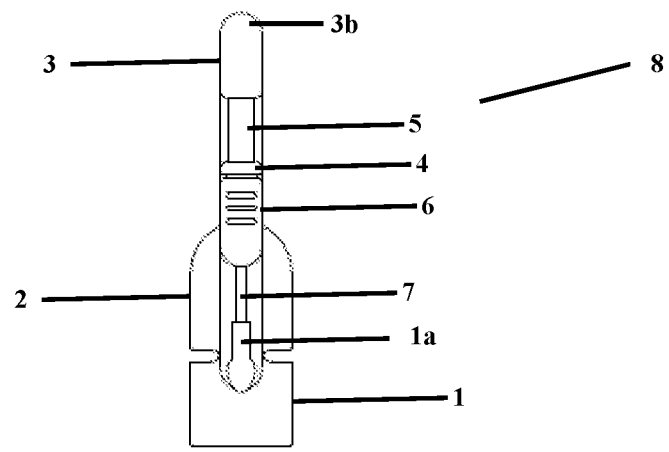
FIG. 4 is a front view of a pet leash clip device for the pet leash system, according to some embodiments.

FIG. 4 is a front view of a pet leash clip device 8 for the pet leash system, displaying the circular base component 1; the dome structure 2 connected to the base 1; a front view of the body 3, including the U-shaped upper portion 3b, embedded down the center of the dome 2 and the top of the base 1; the prong 5 displaying a first portion received within the recess and the distal end; the tab 6 within the slot 7; the access cover 1a; and the shelf-structure 4 extending out over the tab 6; according to some embodiments.

Figure 5:
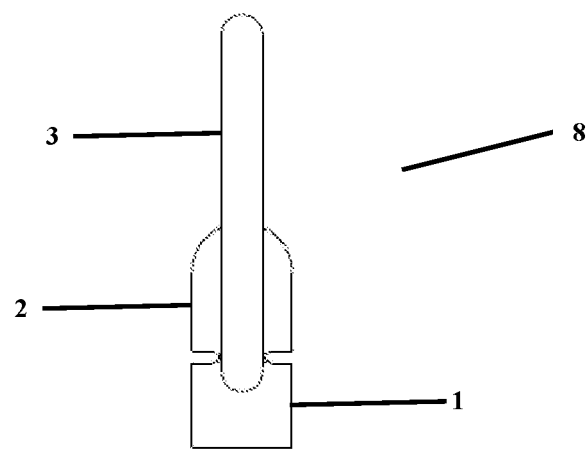
FIG. 5 is a rear view of a pet leash clip device for the pet leash system, according to some embodiments.

FIG. 5 is a rear view of a pet leash clip device 8 for the pet leash system, displaying the rear of the circular base component 1; the rear of the dome structure 2; the rear view of the body 3 embedded down the center of the dome 2 and a top of the base 1, according to some embodiments.

Figure 6:
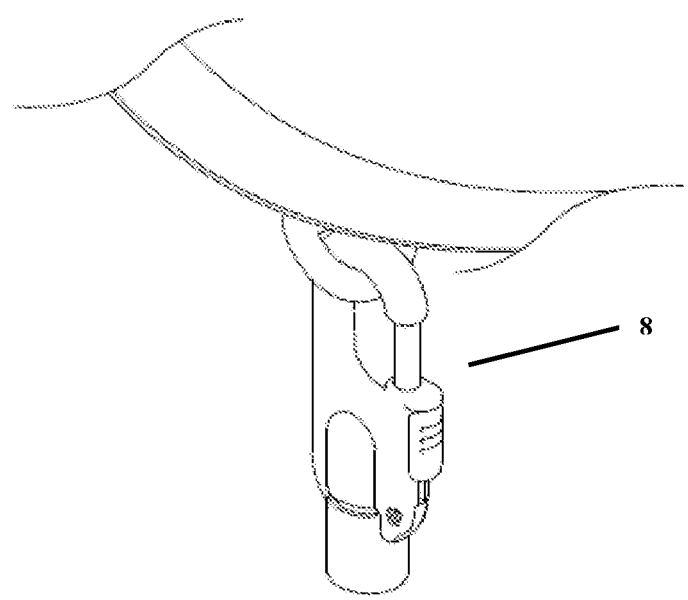
FIG. 6 is a perspective view of a pet leash clip device for the pet leash system as described, displaying the use of the clip, according to some embodiments.

FIG. 6 is a perspective view of a pet leash clip device 8 for the pet leash system as described, displaying the use of the clip, according to some embodiments.

Figure 7:
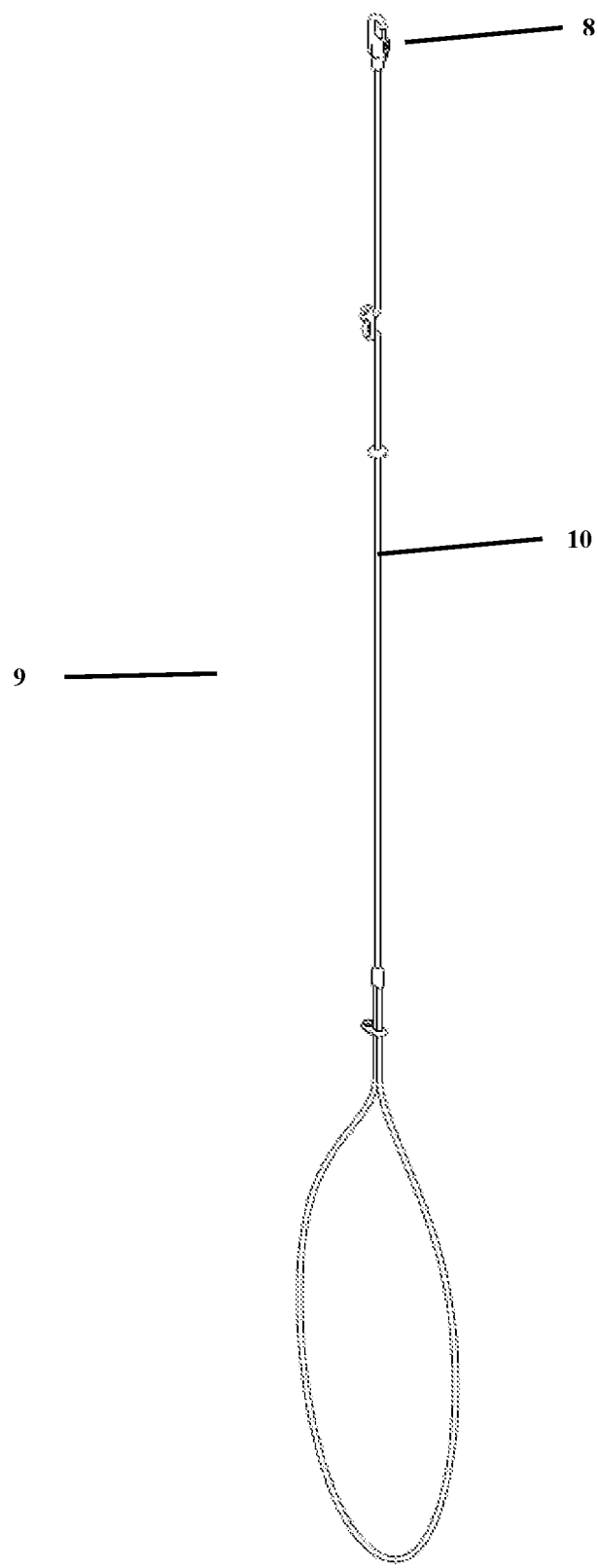
FIG. 7 is a perspective view of a pet leash with the clip device of FIGS. 1-6, as well as cording, according to some embodiments.

FIG. 7 is a perspective view of a pet leash 9 with the clip device 8 of FIGS. 1-6, as well as cording 10 (e.g., leather, plastic, rope, and the like), according to some embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all structure, parameters, dimensions, materials, functionality, and configurations described herein are meant to be an example and that the actual structure, parameters, dimensions, materials, functionality, and configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the claims supported by the present disclosure, and equivalents thereto, inventive embodiments may be practiced otherwise than as specifically described and claimed. Inventive embodiments of the present disclosure are also directed to each individual feature, system, article, structure, material, kit, functionality, step, and method described herein. In addition, any combination of two or more such features, systems, articles, structure, materials, kits, functionalities, steps, and methods, if such are not mutually inconsistent, is included within the inventive scope of the present disclosure. Some embodiments may be distinguishable from the prior art for specifically lacking one or more features/elements/functionality (i.e., claims directed to such embodiments may include negative limitations).

Also, as noted, various inventive concepts may be embodied as one or more methods. Accordingly, the acts performed as part of the method may be ordered in any suitable way, and may be constructed in which acts are performed in an order different than disclosed, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The terms "can" and "may" are used interchangeably in the present disclosure, and indicate that the referred to element, component, structure, function, functionality, objective, advantage, operation, step, process, apparatus, system, device, result, or clarification, has the ability to be used, included, or produced, or otherwise stand for the proposition indicated in the statement for which the term is used (or referred to).

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising"

can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is currently claimed is:

1. A pet leash clip device for a pet leash system comprising:
   a circular base component;
   a dome structure rotatably connected to the circular base component and possessing the same diameter as the circular base component;
   a body embedded down a center of the dome structure and a top of the circular base component;
   a prong including a first portion received within a recess and having a distal end; and
   a tab including a slot-engaging structure configured to ride within a slot
   wherein the prong moves linearly within the recess, which corresponds to the slot, and the distal end of the prong is biased such that it is at least immediately adjacent a distal end of a U-shaped upper portion of a cavity which receives a pet collar so as to either close or substantially close an opening thereof.

2. The device of claim 1, wherein the body has a hook portion including a neck and a U-shaped upper portion forming a roof of a cavity of the pet leash clip device, the U-shaped upper portion including a first side with the distal end having a surface.

3. The device of claim 2, wherein the body has a U-shaped lower portion forming a floor of the cavity of the pet leash clip device.

4. The device of claim 1, wherein the body includes a first side with a distal end having a surface.

5. The device of claim 1, wherein the body includes the slot within a first side.

6. The device of claim 1, wherein the body includes a shelf-structure extending beyond a first side at the distal end so.

7. The device of claim 1, wherein a first side is arranged to align with a first side of the U-shaped upper portion.

8. The device of claim 1, wherein the prong is configured to slide within the recess.

9. The device of claim 1, wherein the tab is configured to allow a user to move the prong to clear the opening to allow receiving of a pet collar.

10. The device of claim 1, wherein the biasing element comprises a spring.

11. A pet leash clip for pet leash system comprising:
    a circular base component;
    a dome structure rotatably connected to the circular base component and possessing the same diameter as the circular base component;
    a body embedded down a center of the dome structure and a top of the circular base component, the body having:
    a hook portion including a neck and a U-shaped upper portion forming a roof of a cavity of the pet leash clip device, the U-shaped upper portion including a first side with a distal end having a surface;
    a U-shaped lower portion forming a floor of the cavity of the pet leash clip device and including:
    the first side with the distal end having the surface and a recess within the distal end, a slot within the first side; and
    a shelf-structure extending beyond the first side at the distal end so,
    wherein the first side is arranged to align with the first side of the U-shaped upper portion;
    an opening is established arranged between the surfaces of the distal ends of each of the first sides of the U-shaped upper portion and U-shaped lower portion;
    a prong including a first portion received within the recess and a distal end, and a tab including a slot-engaging structure configured to ride within the slot, wherein:
    the prong is configured to slide within the recess, wherein:
        the prong moves linearly within the recess, which corresponds to the slot, and the distal end of the prong is biased such that it is at least immediately adjacent the distal end of the upper U-shaped portion so as to either close or substantially close the opening, and
        the tab is configured to allow a user to move the prong to clear the opening to allow receiving of a pet collar.

12. A pet leash system comprising:
a leash; and
a clip device including:
- a circular base component;
- a dome structure rotatably connected to the circular base component and possessing the same diameter as the circular base component;
- a body embedded down a center of the dome structure and a top of the circular base component;
- a prong including a first portion received within a recess and having a distal end; and
- a tab including a slot-engaging structure configured to ride within a slot, wherein the distal end of the prong is biased such that it is at least immediately adjacent a distal end of an upper U-shaped portion of a cavity which receives a pet collar so as to either close or substantially close an opening thereof.

\* \* \* \* \*